Aug. 23, 1949.　　　　R. N. REINHARD　　　　2,480,047
DELIVERY TRUCK OF INTERFITTED TRAILER
AND POWERED TRACTOR UNIT

Filed Nov. 17, 1944　　　　　　　　　　　3 Sheets-Sheet 1

Inventor
Robert N. Reinhard
By Lyon & Lyon
Attorneys

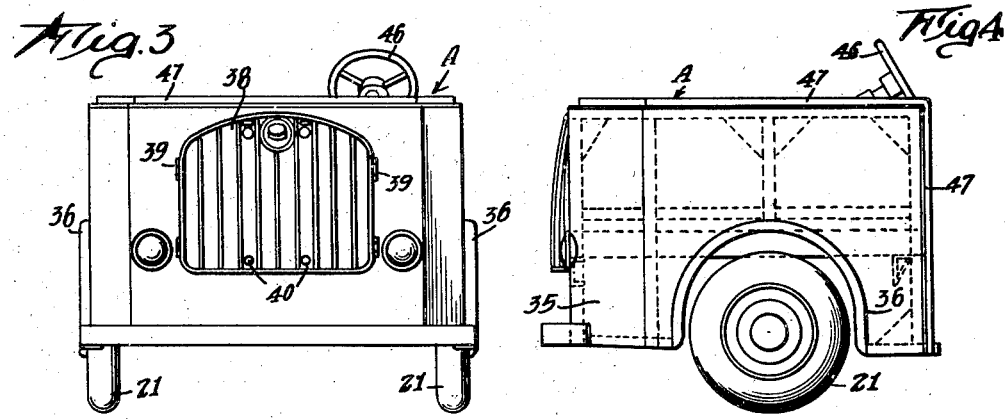
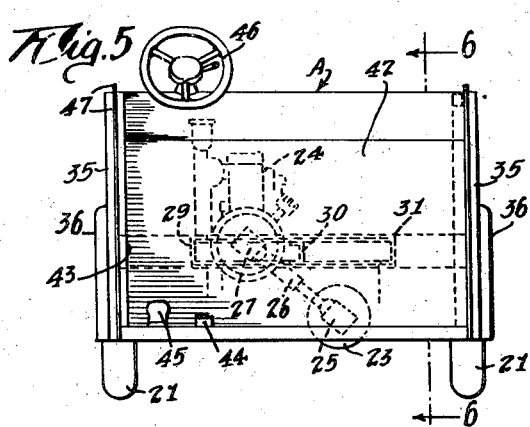
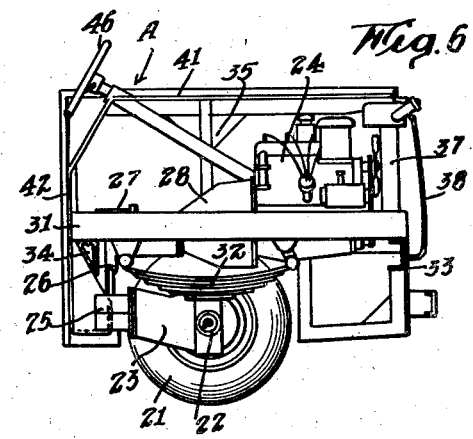
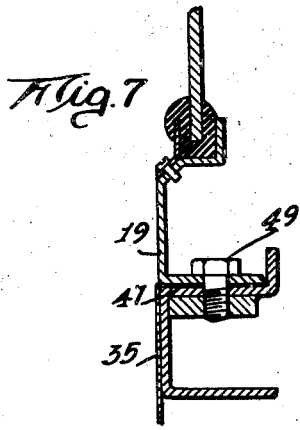
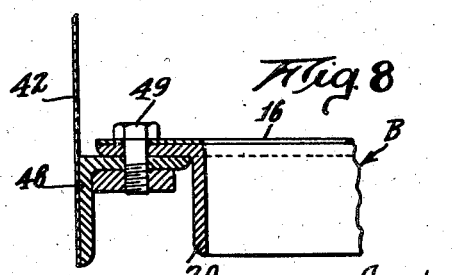

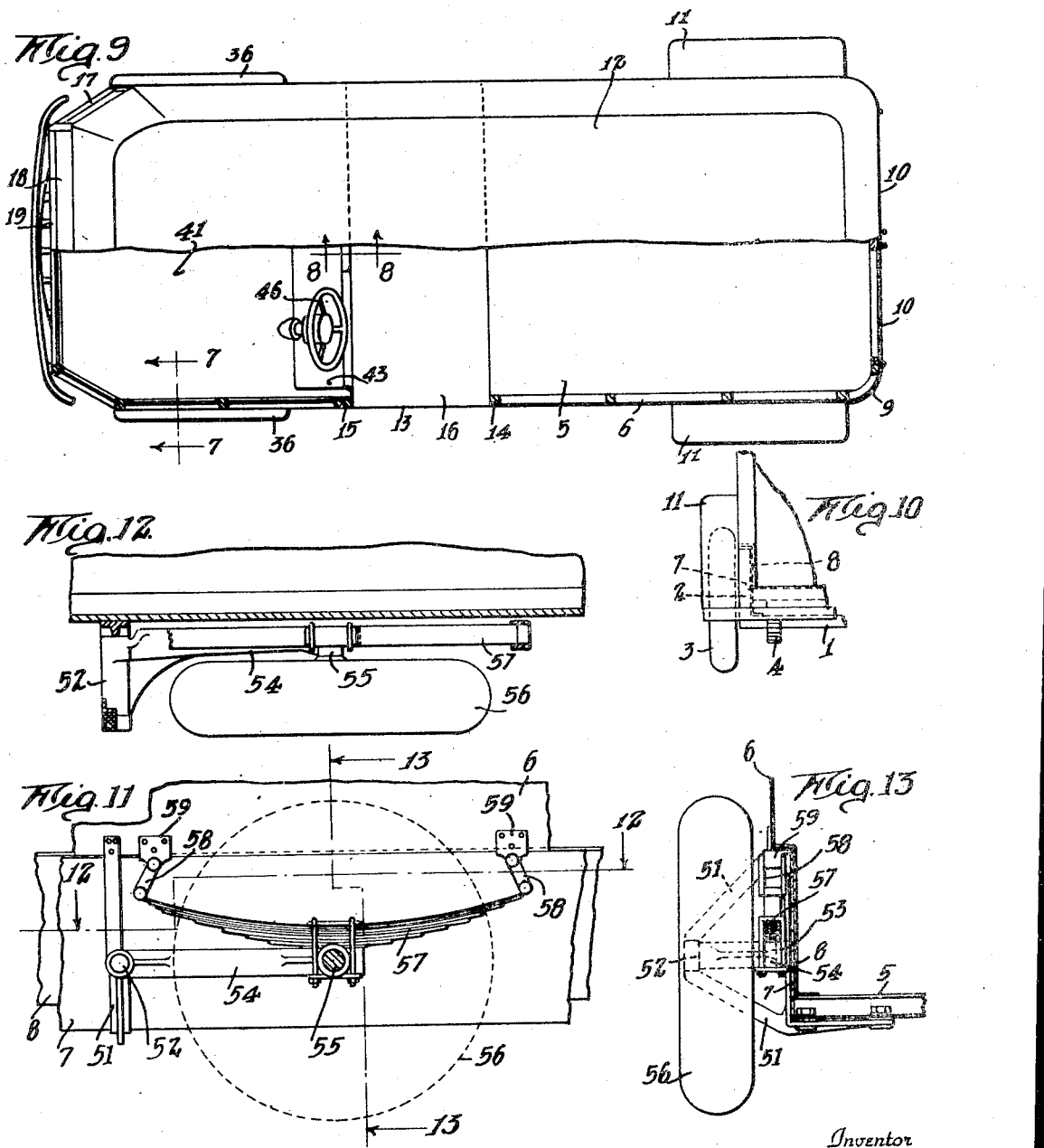

Patented Aug. 23, 1949

2,480,047

UNITED STATES PATENT OFFICE 2,480,047

DELIVERY TRUCK OF INTERFITTED TRAILER AND POWERED TRACTOR UNIT

Robert N. Reinhard, Montrose, Calif., assignor to Golden State Company, Ltd., San Francisco, Calif., a corporation of Delaware Application November 17, 1944, Serial No. 563,852

11 Claims. (Cl. 180—12)

My invention relates to delivery trucks and among the objects of my invention are:

First, to provide a delivery truck of the lowbed, "walk-through" type which is particularly suited for package delivery or house-to-house delivery of commodities such as milk or bread, and which is operated by the driver in a standing position.

Second, to provide a delivery truck wherein all the mechanism both for steering and driving the vehicle is incorporated in a traction unit which is readily separable from although rigidly attached to the body of the vehicle; that is, the traction unit includes the front wheels of the vehicle which are used both for guiding and driving the vehicle, as well as the necessary power plant, transmission, drive shaft, differential steering wheel, and their various accessory elements.

Third, to provide a delivery truck wherein the "walk-through" passageway continues from side to side of the truck at the height of but a single step from the ground without drive shaft tunnels or other obstructions traversing the passageway.

Fourth, to provide a delivery truck of this character wherein the floor of the cargo space may be as low or virtually as low throughout as the walk-through passageway, and likewise without elevated portions to clear drive shafts or differentials as is the case with trucks of conventional design.

Fifth, to provide a delivery truck of a type possessing the above-stated advantages and characteristics and wherein the readily separable front traction unit and the truck body have a cooperating and interfitting relationship when assembled which serves to hold the parts against accidental displacement or disassembly, and which utilizes the torque of the engine when running, as well as gravity acting on the body, the load if any, and the traction unit, in the performance of the cooperative and interfitting relationship between the traction unit and the body.

With the above and other objects in view, as may appear hereinafter, reference is directed to the accompanying drawings, in which Figure 1 is a side view of the delivery truck with the body unit and traction unit assembled.

Figure 3 is a front view of the traction unit.

Figure 4 is a side view of the traction unit, showing by dotted lines the frame arrangement therefor.

Figure 5 is a rear elevational view of the traction unit indicating fragmentarily, by dotted lines, the location of the engine, differential and engine-supporting frame.

Figure 6 is a sectional view of the traction unit taken through 6—6 of Fig. 5.

Figures 7 and 8 are enlarged fragmentary sectional views taken through 7—7 and 8—8 of Fig. 9, showing the manner in which the traction unit is joined to the body unit.

Figure 1:
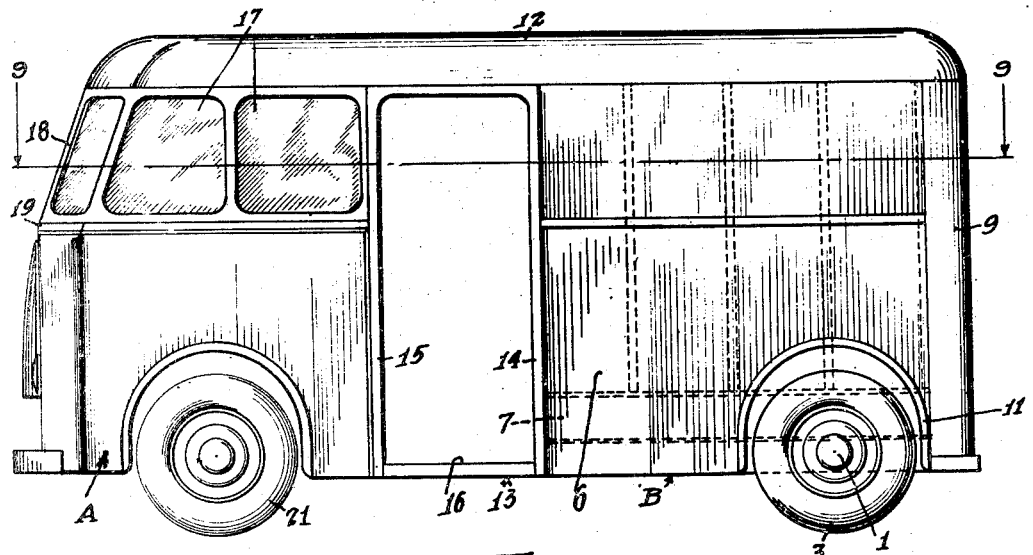

Figure 9 is a partial plan, partial sectional view of the delivery truck, the portion in section being essentially diagrammatical and taken along the line 9—9 of Fig. 1.

Figure 10 is a fragmentary rear elevational view of the delivery truck, indicating the arrangement of the rear wheel, axle and spring in order to provide a low floor.

Figures 11, 12 and 13 illustrate a modified form of rear wheel mounting, wherein:

Figure 11 is a side view with the wheel removed, but its position indicated by dotted outline.

Figure 12 is a transverse sectional view thereof taken substantially through 12—12 of Fig. 11, with the wheel in elevation.

Figure 13 is a partial plan, partial sectional view taken through 13—13 of Fig. 11.

My delivery truck comprises generally a traction unit A which includes driving and guiding wheels together with its power supply and control means, a body or box-like trailer unit B which is detachable from the traction unit and supported by idler wheels, the body unit being entirely free of any operating mechanism except, perhaps, a brake control connected with the idler wheels.

The body or box-like trailer unit B includes a rear axle 1 indicated fragmentarily in Fig. 10. The rear axle is in the form of a straight bar with upwardly offset end portions 2 which protrude from under the body and carry wheels 3. Springs 4 connect the rear axle to the floor structure 5 of the body.

The body unit is, in general, box-like in form with a re-entrant lower forward corner into which fits complementarily the traction unit A. The floor structure of the body unit is flat and uniform in height. Vertical side panels 6 extend upwardly from the sides of the floor structure. The side panels are preferably connected with the floor structure 5 by means of Z-beams 7 and 8 which join to the top and bottom faces of the floor structure. The Z-beams form the chassis frame of the body unit. The floor structure, as well as the side panels comprise a grid-work of reinforcing members covered by sheet material, preferably sheet metal, so arranged that the sheet material may carry some of the load imposed thereon.

Rounded vertical corner posts 9 formed in part of sheet metal are provided at the margin of the side panels. Suitable doors 10 close the rear end of the body unit.

The wheels 3 are preferably located outboard of the side panels 6 and are covered by fenders 11.

The body or box-like trailer unit is provided with a top structure 12, likewise comprising a grid-work of reinforcing members covered with sheet material. The corners and side margins of the top structure are rounded, the latter joining the upper margins of the side panels 6. The top structure projects forwardly from the side panels 6. Door frames 13 are provided at each side of the body unit forwardly of the side panels 6 and under the top structure 12. The door frames include rear posts 14 which may form reinforced edges for the side panels 6 and forward posts 15, the lower portions of which are joined to the traction unit, to be described hereinafter. A passageway door 16 extends between the doorways defined by the door frame 13. This passageway may be slightly lower than the door structure 5. It has been found feasible to locate the passageway floor only twelve inches from the ground, and yet provide a clearance of ten inches. The passageway floor may be of uniform height throughout without obstruction of any character.

The forwardly projected portion of the top structure 12 which continues beyond the door frame 13 is provided with depending side windows 17 and front windows 18. The under edges of the side and front windows form a window sill 19 which is reinforced and adapted to rest on the traction unit. Thus the reinforced sill 19 and the lower portion of post 15 are bearing surfaces which form an internal angle into which the traction unit A is fitted.

The traction unit A rides on a pair of combined drive and guide wheels 21. These constitute the forward wheels of the vehicle and are connected by an axle housing 22. A suitable universal joint is provided between the drive wheels, and the housing to permit turning of the wheels for guiding purposes, as well as to afford a driving connection. The housing 22 contains conventional drive axles which are joined to a differential contained in a differential housing 23 interposed in the axle housing 22. The differential is connected to a motor 24 through bevel gears contained in a bevel gear housing 25, a propeller shaft structure 26, a second set of bevel gears contained in a housing 27, and to a transmission contained in a transmission housing 28. The propeller shaft structure preferably includes a suitable sliding joint as well as universal joints to allow for relative movement of the differential housing and motor.

The motor 24 is mounted between a pair of motor frame members 29 and 30. The differential housing 23 is offset to one side of a longitudinal center line through the traction unit, whereas the motor 24 is offset to the other side of the center line. The outboard motor frame member 29 also forms one of the chassis members for the traction unit. A corresponding chassis frame member 31 is located an equal distance from the opposite side of the traction unit. The two chassis frame members 29 and 31 are equipped with springs 32 which rest on the axle housing 22. The frame members 29, 30 and 31 are supported by cross frames 33 and 34. The extremities of the cross frame support side panels 35. Each side panel includes reinforcing members covered by sheet metal. The front wheels 21 are set within the traction unit A; consequently the side panels 35 are cut out to form fender wells which receive fenders 36.

The motor or power unit may be a conventional internal combustion engine, provided with a radiator 37 disposed at the forward end of the traction unit. The radiator is located off-center but is disposed behind a grill 38 which although centered with respect to the front of the traction unit is wide enough to embrace the radiator. The grill 38 is preferably in the form of a pair of gates provided with hinges 39 at their remote margins and provided with latches 40 at their adjacent edges.

The traction unit is covered by a top deck 41 and its rear side is covered by a dash-plate or apron 42. The dash-plate 42 is recessed as indicated at 43 adjacent one side, preferably the left side as viewed in Fig. 5, to provide space for the control element of a traction unit. It is preferred to use a motor which is equipped with a hydraulic transmission, in which case the control elements include an accelerator and clutch pedals 44 and 45 located on a supplemental floor formed in the recess at a level with the passageway floor 16. In addition a steering wheel 46 projects through the top deck 41 above the recess. The steering wheel may carry the necessary gear shift levers for operating the transmission.

The top deck 41 and the edges of the dashplate 42 are provided with marginal flanges 47, as shown best in Fig. 7, which receive the sill 19 and the forward posts 15 of the door frame. The lower edge of the dash-plate 42 is provided with an angle bracket reinforcement 48 which underlies a corresponding angle bracket reinforcement 20 extending along the lower forward edge of the passageway floor 16 of the body unit B, as shown best in Fig. 8.

Bolts 49 extend downwardly through the sill 19 and the angle bracket 20 and forwardly through the forward post 15 into the traction unit in order to secure the traction unit in place, as shown in Fig. 1.

Figure 2:
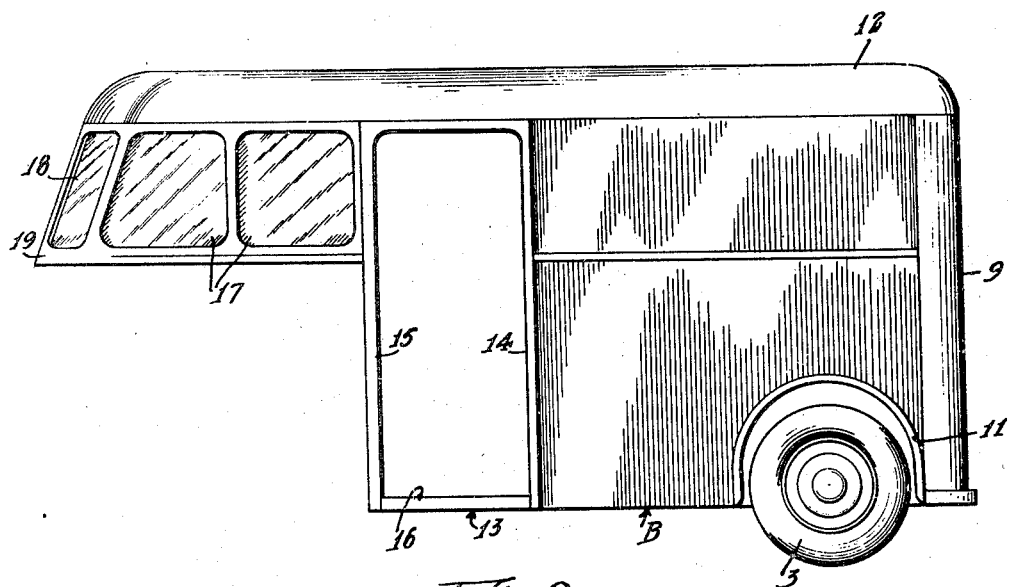
Figure 2 is a similar side view of the body unit alone.

It will be noted that all controls afforded the body unit are contained in the traction unit but are accessible to an operator standing in the passageway provided in the body unit. Inasmuch as the entire operating mechanism is contained in the traction unit there are no drive connections or other devices which need to be disconnected when it is desirable to remove the traction unit with the minor exception of electrical connection to the tail-light of the vehicle and possibly a connection to brakes provided on the rear wheels. Because of the fact that no connection is required with the rear wheels the bed or floor of the body unit may be exceptionally low. The body unit need be no higher than the passageway floor 16 although in the construction shown in Figs. 1 and 2 the floor is slightly higher to accommodate the rear axle 1.

By reason of the fact that the rear wheels are mere idler wheels they may be conveniently attached by independent spring mountings, as shown in Figs. 11, 12 and 13. With reference to these figures, a bearing bracket 51 is secured to the body unit and chassis frame which comprises the Z-beams 7 and 8. Each bracket 51 provides an inboard and outboard bearing 52 and 53, respectively, between which is journaled a lever arm 54 which extends backwardly from the bracket 51 along the outer side of the body chassis frame. The rear end of the lever arm 54 is provided with an outwardly directed stub spindle 55 which journals a wheel 56. The extended end of the lever arm 54 supports a multiple leaf spring 57 which extends forwardly and rearwardly along the inner side of the wheel 56. The ends of the leaf spring are connected to shackles 58 which in turn are journaled in brackets 59 secured to the upper flanges of the Z-beams 7 and 8. With this construction the floor level of the body unit may be as low as the passageway floor 16 and yet maintain ample road clearance.

It should be noted that the side walls 35 together with the marginal reinforcing 47 of the bracket unit provide a rigid frame which reinforces the lower margin of the windows and the forward side of the door and prevent any bending, particularly at the corner junctures therebetween.

It will be noted that the traction unit, unless propped or mounted in assembled relationship with the body, will topple over until the forward end engages the ground. This is because the traction unit is overbalanced, as shown in Figure 6, in the forward direction due to the forward placement of the motor with respect to the axes of the front wheels.

It will also be noted that the engaging surface between the traction unit and the body is primarily, as shown in Figure 7, between the upper surfaces of the member 47 and the under surfaces of the flange 19. These surfaces extend horizontally throughout the extent of the length of the traction unit and thence downwardly along the rear edge thereof adjacent the door 15. These two surfaces are shown as horizontal and vertical and are, therefore, at right angles or approximately right angles.

It will be further noted that the upper horizontal surface which extends along both sides of the truck, are located substantially above the axis of the traction unit and the points of support are provided by such surface on opposite sides of the axis of the traction unit.

This novel construction, as clearly shown in the figures of the drawings, results in a unique and very satisfactory action in the functioning of the parts in use. When the truck is being driven in a forward direction, the torque of the engine which serves to drive the front wheels forwardly also tends to drive the traction unit chassis and motor block in a clockwise direction, as viewed in Figure 1 of the drawing. Every part of the traction unit thus has a tendency to rotate against the gravitational fall of the unit when standing alone, and each part is thereby tending to rotate in a direction perpendicular to the radius drawn through the point in question and the axis of the front wheels. Similarly, the body is tending to rotate under the action of gravity around the axis of the rear wheels, and each part of the body is tending to move at right angles to the axis drawn through the point in question and the axis of the rear whels. These two movements tend to force the traction unit into intimate and cooperative engagement with the reentrant part of the body and to hold the same in firm cooperative relationship. The result is that very little strain is placed on the holding bolts which, except in cases of extraordinary usage, are not actually necessary to hold the parts together.

Furthermore, a very easy and simple assembly operation is provided for the reason that the body can be lifted at the front end an amount sufficient to extend over the traction unit, and when lowered by virtue of the engagement between the parts and the downward and forward movement of the body when pivoted on the rear axle, the traction unit will be engaged at its upstanding rear corner by the body, with the result that the weight of the body will cause the traction unit to tip up into intimate fitting relationship with the reentrant part of the body. Further movement under the influence of gravity, as well as under the influence of the torque of the engine when running, causes the two parts, pivoting around their axes, respectively, to assume their final interfitting relationship. When the parts are in place the holding bolts 49 can be inserted very readily and quickly.

Many other embodiments of the invention may be resorted to without departing from the spirit of the invention.

I claim:

1. A vehicle structure comprising: a box-like trailer unit of substantially rectilinear shape with a full-width re-entrant lower forward internal angle corner recess formed by bearing surfaces; a self contained tractor and guide unit for said re-entrant corner, said tractor and guide unit fitting entirely within said re-entrant corner and being complementary to said trailer unit and providing a support for the forward end of said trailer unit along spaced lines located, respectively, above a wheel of said tractor and guide unit and extending beyond the extremities of its associated wheel on each side of the axis thereof; and means for removably and rigidly securing said units together.

2. A construction as set forth in claim 1 wherein the top and rear sides of said tractor and guide unit is exposed to the interior of said trailer unit, and a steering wheel accessible from within said trailer unit projects from said traction and guide unit.

3. A vehicle structure, comprising: a box-like trailer unit of substantially rectilinear shape with a full-width re-entrant lower forward internal angle corner recess formed by bearing surfaces, the lower and forward side of said corner forming an opening into said trailer unit; a self contained tractor and guide unit also of substantially rectilinear form and complementary to said trailer unit and providing a support for the forward end of said trailer unit along spaced lines located, respectively, above a wheel of said tractor and guide unit and extending beyond the extremities of its associated wheel on each side of the axis thereof, said tractor and guide unit adapted to fit completely within said re-entrant corner to support the trailer unit by contact along said spaced lines; said tractor and guide unit including a steering wheel and operating pedals accessible from the interior of said trailer unit.

4. A vehicle structure, comprising: a box-like body unit including top, floor and side panels, the top of said body structure extending forwardly and frame means defining window spaces depending therefrom and defining with the forward ends of said side panels a re-entrant open corner; a box-like self contained traction and guide unit adapted to fit within the boundaries of said re-entrant corner and to support the body unit through contact with said frame means of said re-entrant corner and having rear and upper sides exposed to the interior of said body unit; said traction and guide unit providing a support for the forward end of said body unit along spaced lines located, respectively, above a wheel of said traction and guide unit and extending beyond the extremities of its associated wheel on each side of the axis thereof; said traction and guide unit including control means accessible from within said body unit; and means for removably securing said units together in rigid relation.

5. A combination as set forth in claim 4 wherein combined drive and guide wheels support said traction and guide unit and idler wheels support said body unit.

6. A construction as set forth in claim 4 wherein the forward portions of said side panels define doorways, and a walk-through passage having a floor of uniform height extends between said doorways across the entire width of the body unit.

7. A construction as set forth in claim 4 wherein the top and rear sides of said traction and guide unit is exposed to the interior of said body unit, and control devices for said traction and guide unit are, thereby, accessible from said body unit; and wherein doorways are defined at opposite sides of said body unit immediately to the rear of said traction and guide unit, and a walk-through passageway extends across said body between said doorways.

8. A delivery truck comprising: a body unit including a floor, side panels and top, the top projecting forwardly of the side panels; a frame structure defining window spaces depending from the forwardly projecting portion of said top; a door frame interposed between said window frame structure and forward margin of each of said side panels and extending between the top and floor of said body, and a walk-through passageway extending from side to side of said body unit between said door frames; idler wheels for supporting said body unit; and a traction unit including a housing structure fitting under said window frame structure and forward sides of said door frames; guide and drive wheels for said traction unit; a power supply for said guide and drive wheels contained within said housing structure; and a steering wheel and control means extending from said housing structure and accessible from said passageway.

9. A delivery truck comprising: a body unit including a floor, side panels and top, the top projecting forwardly of the side panels; a frame structure defining window spaces depending from the forwardly projecting portion of said top; a door frame interposed between said window frame structure and forward margin of each of said side panels and extending between the top and floor of said body, and a walk-through passageway extending from side to side of said body unit between said door frames; idler wheels for supporting said body unit; and a traction unit including, guide and drive wheels, a power supply for said wheels, and a housing fitting under said window frame structure and against the forward side of said door frames to complete the sides and forward end of said body unit, said housing including a wall forming the forward side of said passageway and a deck extending forwardly from said wall to the lower margins at the forward end of said window frame structure.

10. A vehicle structure, comprising: a box-like trailer unit including top, sides and floor arranged in substantially rectilinear form with a reentrant lower forward corner, window frames above said corner and door frames to the rear thereof, parts of said frames forming a marginal reinforcing for said corner extending horizontally around the undersides of said window frames, vertically along the forward sides of said door frames, said marginal reinforcing continuing across said trailer unit between said door frames; a box-like tractor unit including a housing having reinforced side walls complementary to the sides of said trailer unit and adapted to be secured to and hold said marginal reinforcing, said housing also having a rear end wall extending between said door frames and defining the forward side of a passageway therebetween, and a top deck extending from said wall to the under margins of said window frame; and a self contained drive and guide mechanism within said tractor unit including guide and drive wheels, power plant, steering and control means therefor, said steering and control means being exposed to said passageway for access to an operator standing therein.

11. A delivery truck comprising: a body unit including a floor, side panels and top, the top projecting forwardly of the side panels, a frame structure defining window spaces depending from the forwardly projecting portion of said top; a door frame interposed between said window frame structure and forward margin of each of said side panels and extending between the top and floor of said body, a walk-through passageway extending from side to side of said body unit between said door frames; chassis frame members incorporated within and extending along the lower portions of said side panels; and a traction unit including, guide and drive wheels, a power supply for said wheels, and a housing fitting under said window frame structure and against the forward side of said door frame to complete the sides and forward end of said body unit, said housing including a wall forming the forward side of said passageway and a deck extending forwardly from said wall to the lower margins at the forward end of said window frame structure.

ROBERT N. REINHARD.

REFERENCES CITED

The following references are of record in the file of this patent:

UNITED STATES PATENTS

| Number | Name | Date |
| --- | --- | --- |
| 1,261,603 | Palmer | Apr. 2, 1918 |
| 1,777,966 | Fageol | Oct. 7, 1930 |
| 1,844,510 | Kennedy | Feb. 9, 1932 |
| 1,855,642 | Masury | Apr. 26, 1932 |
| 2,018,443 | Fageol | Oct. 22, 1935 |
| 2,134,387 | Zimka et al. | Oct. 25, 1938 |
| 2,172,831 | Carlson | Sept. 12, 1939 |
| 2,349,196 | Perkins | May 16, 1944 |

FOREIGN PATENTS

| Number | Country | Date |
| --- | --- | --- |
| 128,430 | Austria | May 25, 1932 |
| 466,214 | Great Britain | May 25, 1937 |

OTHER REFERENCES

Twin Coach Bulletin, Twin Coach Corp., Kent, Ohio, rec'd U. S. Patent Office Nov. 1, 1932 (available in Div. 47).